United States Patent [19]

Ito et al.

[11] Patent Number: 5,235,396
[45] Date of Patent: Aug. 10, 1993

[54] IMAGE PROCESSING APPARATUS HAVING AN IMAGE PROCESSING MODE SELECTED BY A SPECIAL SHEET

[75] Inventors: Hirohiko Ito, Kawasaki; Hiroshi Ohmura, Inagi; Masanori Sakai, Yokohama; Hideto Kohtani, Yokohama; Takehito Utsunomiya, Yokohama, all of Japan

[73] Assignee: Canon Kabushiki Kaisha, Tokyo, Japan

[21] Appl. No.: 913,048

[22] Filed: Jul. 14, 1992

[30] Foreign Application Priority Data

Jul. 15, 1991 [JP] Japan .................... 3-198250

[51] Int. Cl.⁵ .................................. G03G 21/00
[52] U.S. Cl. ........................ 355/313; 355/202
[58] Field of Search .................. 355/200–202, 355/308, 313, 319, 320, 309, 204, 321; 346/160; 358/300; 364/525

[56] References Cited

U.S. PATENT DOCUMENTS

| | | | |
|---|---|---|---|
| 4,126,390 | 11/1978 | Connin | 355/313 X |
| 4,248,528 | 2/1981 | Sahay | 355/308 |
| 4,629,311 | 12/1986 | Kaneko et al. | 355/319 |
| 4,757,348 | 7/1988 | Rourke et al. | 346/160 X |
| 4,847,656 | 7/1989 | Kuno et al. | 355/202 |

FOREIGN PATENT DOCUMENTS

| | | | |
|---|---|---|---|
| 0101958 | 8/1980 | Japan | 355/200 |
| 0115049 | 9/1980 | Japan | 355/200 |
| 62-005762 | 1/1987 | Japan . | |
| 2-039167 | 2/1990 | Japan . | |
| 3-149964 | 6/1991 | Japan . | |

OTHER PUBLICATIONS

European Search Report.

*Primary Examiner*—A. T. Grimley
*Assistant Examiner*—William J. Royer
*Attorney, Agent, or Firm*—Fitzpatrick, Cella, Harper & Scinto

[57] ABSTRACT

An image processing mode setting apparatus for setting an image processing mode by using a special sheet such as a mark sheet includes a base plate on which a plurality of originals are stackable, an original feeding device for feeding the originals on the base plate one by one to the exposing position and for feeding out the originals onto the base plate after completion of the exposure, and a read-out unit to read the images of the originals fed to the exposing position by the feeding device. A sensor detects a mark sheet on which the image processing mode has been written on the basis of the image signal generated from the read-out unit. A memory stores the image processing mode written on the mark sheet which has been detected by the sensor and a setting unit sets the image processing mode stored in the memory for the original which is fed before the mark sheet after all of the originals on the base plate were fed.

7 Claims, 5 Drawing Sheets

IMAGE PROCESSING APPARATUS HAVING AN IMAGE PROCESSING MODE SELECTED BY A SPECIAL SHEET

BACKGROUND OF THE INVENTION

1. Field of the Invention

The invention relates to an image processing apparatus for setting an image processing mode by using a special sheet such as a mark sheet or the like.

2. Related Background Art

Hitherto, there is considered a copying apparatus for reading a sheet material such as mark sheet on which a copying mode has been written, a sheet onto which a bar code has been given or the like, and for setting the copying mode by a read-out output.

As such a copying apparatus, there are the first type in which the sheet material is fed by an automatic document feeder and copying mode information written on the sheet material is read out and the second type in which the copying mode information written on the sheet material is read out without using the automatic document feeder.

In many cases, the first type is used to automatically execute copying processes. However, in the case where the operator doesn't put the mark sheet to the position to read out the mark sheet for the first time, there is a drawback such that a desired copying mode cannot be set for the original which has been fed before the mark sheet.

SUMMARY OF THE INVENTION

It is an object of the invention to provide an image processing apparatus which can eliminate the foregoing drawbacks.

Another object of the invention is to provide an image processing apparatus which can set a desired image processing mode even for an original which is fed before a special sheet on which an image processing mode has been written among a bundle of originals.

Still another object of the invention is to provide an image processing apparatus which can set a desired image processing mode for any one of an original which is fed before a special sheet on which an image processing mode has been written and an original which is fed after the special sheet among a bundle of originals.

Further another object of the invention is to provide an image processing apparatus which can set different image processing modes for a plurality of originals by one special sheet.

The above and other objects and features of the present invention will become apparent from the following detailed description and the appended claims with reference to the accompanying drawings.

DETAILED DESCRIPTION OF THE PREFERRED EMBODIMENTS

Figure 1:
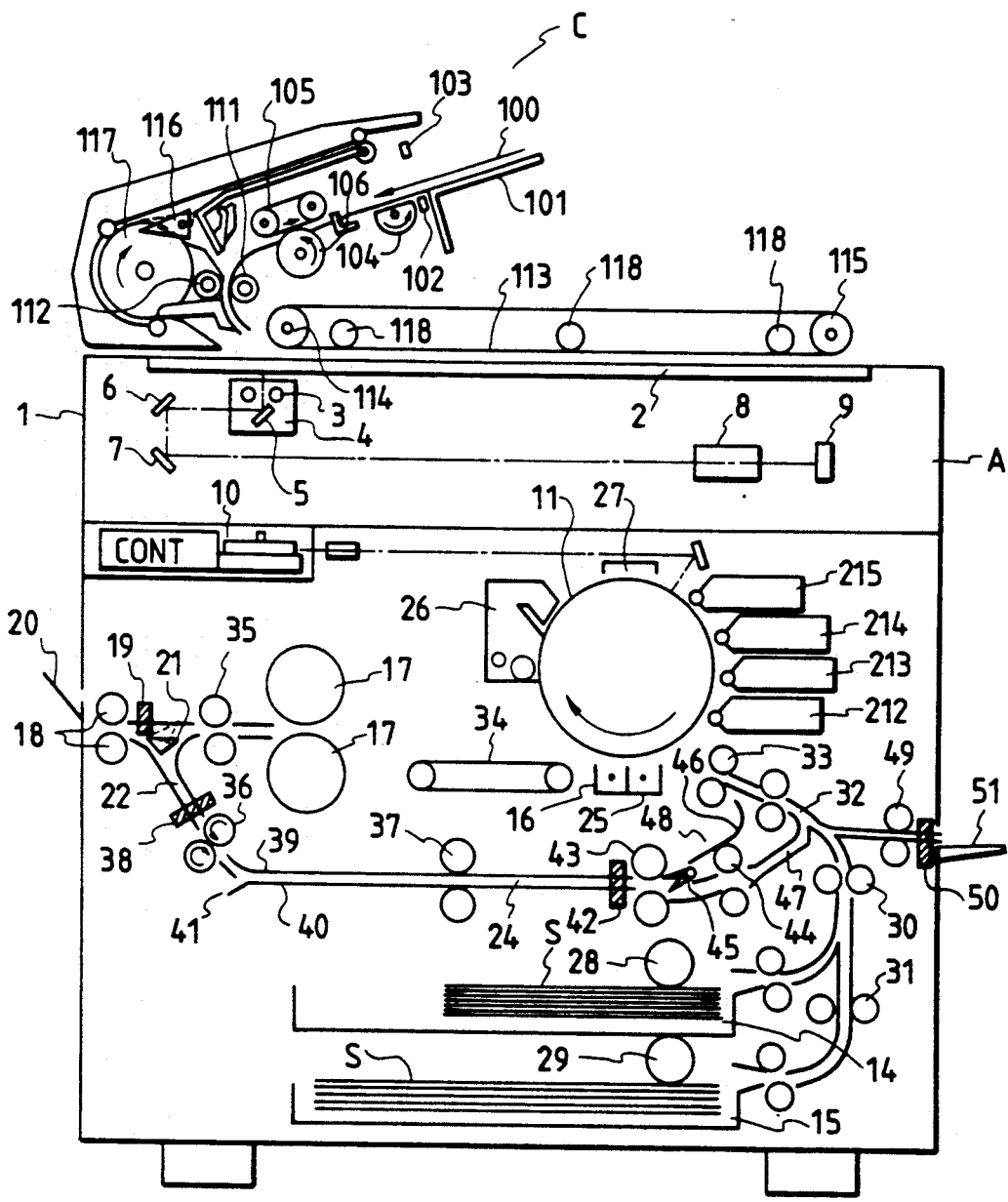
FIG. 1 is a cross sectional view for explaining a construction of a copying apparatus showing an embodiment of the invention.

FIG. 1 is a cross sectional view for explaining a construction of a copying apparatus showing an embodiment of the invention. For instance, FIG. 1 shows the case of a digital copying apparatus. The construction and operation will now be described hereinbelow.

Reference character C denotes a recyclic document feeder (RDF). Originals and mark sheets are piled and put on an original base plate 101 in a state in which the surface of the original to be copied faces upward. The presence or absence of the original is detected by a light emitting device 102 and a photo sensitive device 103. When the originals exist on the base plate 101, a feed roller 104, a separating belt 105, and a conveying roller 106 are rotated in the direction shown by an arrow by a copy start signal. The bottom original on the base plate 101 is fed. The fed original is sent by resist rollers 111 and 112 to a conveying belt 113 which is rotating over an original platen 2. The original is stopped at a predetermined position over the platen 2 by stopping the conveying belt 113 at a predetermined timing. The conveying belt 113 has a roller 114 to drive the belt 113 itself, a driver roller 115, and pressing rollers 118 to stably feed an original 100. Reference numeral 117 denotes a feed-out/reversal roller and reference numeral 116 denotes a flapper for switching a feeding path of an original. The recyclic document feeder (RDF) is constructed by the above component parts 101 to 106 and 111 to 118.

A copying apparatus 1 comprises the platen 2 and mirror 5, a light source 3, and mirror 5 two cassettes 14 and 15, a hand insertion paper feed port 51, sheet sensor 50 and the like. An image forming unit comprising a cylindrical photosensitive material 11 and the like is arranged in almost the central portion of the copying apparatus 1. Four developing devices 212 to 215 having therein different color toners are arranged near the periphery of the photosensitive material 11. Further, charger 27 is provided to charge the photosensitive material 11, a copy transfer charging device 25, a separation charging device 16 are arranged on the downstream side in the rotating direction of the photosensitive material 11. Feed rollers 28 and 29 are provided for the cassettes 14 and 15. A copy transfer paper S is guided to a pair of resist rollers 33 by a pair of conveying rollers 30 and a pair of conveying rollers 31 through a path 32, respectively. Feed rollers 49 are arranged near charger 27 is provided to charge the photosensitive material 11, the hand insertion feed port 51. The paper S is guided to the pair of resist rollers 33 through the path 32. The paper S which is copied in the multiplex copying mode or the two-sided copying mode is guided to the pair of resist rollers 33 through a copy transfer paper conveying path 24 arranged below the main body of the copying apparatus 1. A fixing device 17 is arranged on the downstream of a conveying apparatus 34 having a conveying belt. Further, a first pair of feed-out rollers 35 and a second pair of feed-out rollers 18 to feed out the paper S to a feed-out tray 20 are arranged on the downstream of the fixing device 17. A flapper 21 is arranged between the first pair of feed-out rollers 35 and the second pair of feed-out rollers 18. Ordinarily, in the copying mode, the copy transfer paper S fed out from the first pair of feed-out rollers 35 is conveyed along the upper side of the flapper 21 which has been switched to a position shown by a solid line, thereby making a copy transfer paper detecting sensor 19 operative. While the passage of the paper S is being detected, the paper is discharged to the outside of the apparatus by the second pair of feed-out rollers 18 which forwardly rotate. On the other hand, in the two-sides copying mode, the paper S is partially discharged to the outside of the apparatus by the forward rotation of the second pair of feed-out rollers 18 until the halfway in a manner similar to the case in the ordinary mode. However, when the sensor 19 detects that the rear edge of the paper has passed the flapper 21, the second pair of feed-out rollers 18 are reversely rotated and the paper S is guided by the left side portion of the flapper 21 and is conveyed to a path 22. Therefore, in the two-sided copying mode, the paper S is conveyed to the conveying path 24 by the second pair of feed-out rollers 18, sensor 19, and path 22. In the multiplex copying mode, the flapper 21 is switched to the position shown by a broken line. The paper S conveyed by the first pair of feed-out rollers 35 is directly conveyed to the path 22 by the guiding operation of the right side portion of the flapper 21. The paper S which has reached the path 22 is guided to the pair of resist rollers 33 through the paper conveying path 24 having a pair of conveying rollers 36 and a pair of conveying rollers 37 constructing conveying means.

In the paper conveying path 24, the pair of conveying rollers 36 are driven by driving means (not shown) and are always rotating in the directions shown by arrow in the diagram during the operation of the copying apparatus 1. A copy transfer paper detecting sensor 38 is arranged just before the pair of conveying rollers 36.

An upper guide plate 39 and a lower guide plate 40 are arranged between the pair of conveying rollers 36 and the pair of conveying rollers 37. The paper which has passed the pair of conveying rollers 36 is guided to the pair of conveying rollers 37 by the upper guide plate 39. Further, one end of the lower guide plate 40 forms a refuge portion 41 between the pair of conveying rollers 36. A pair of conveying rollers 43 are provided at a position beyond a paper detecting sensor 42. A flapper 45 to separate the bundle of copy transfer papers is further arranged at a position beyond the rollers 43. A pair of conveying rollers 44 are arranged on the downstream of the flapper 45. The paper is guided to the pair of resist rollers 33 through a path 47. A guide plate 46 is provided above the flapper 45. A portion over the guide plate 46 is used as a refuge portion 48 of the bundle of papers.

The original conveyed to a predetermined position on the platen 2, optical system 4 which controls light source 3, illuminates the original and the reflected light is collected onto the surface of a CCD sensor 9 through mirrors 5 to 7 and a lens 8. The mirror 5 and the mirrors 6 and 7 move at a relative speed of 2:1. An optical system which is constructed by the above component elements 3 to 8 is reciprocated at a predetermined speed while applying a PLL by a DC servo motor (not shown). In the direct copying mode (equal magnification), the moving speed of the optical system is set to 18 mm/sec in case of the going path (from the left to the right) and is set to 800 mm/sec in case of the return path (from the right to the left) irrespective of the copy magnification. A size of original which can be processed is set to up to "A3" size and a resolution is equal to 400 dpi/inch, so that as the number of bits of the CCD sensor 9, 4678 (297/25.4×400) bits are necessary. Therefore, the CCD sensor 9 of 5000 bits is used in a reader A. A main scan period of the CCD sensor 9 is equal to 352.7 $\mu$sec (106/180×25.4/400). Prior to scanning to copy, the original 100 is prescanned. Reference numeral 10 denotes an exposure control unit and CONT indicates a controller unit.

A control construction of the reader A will now be described with reference to a block diagram shown in FIG. 2.

Figure 2:
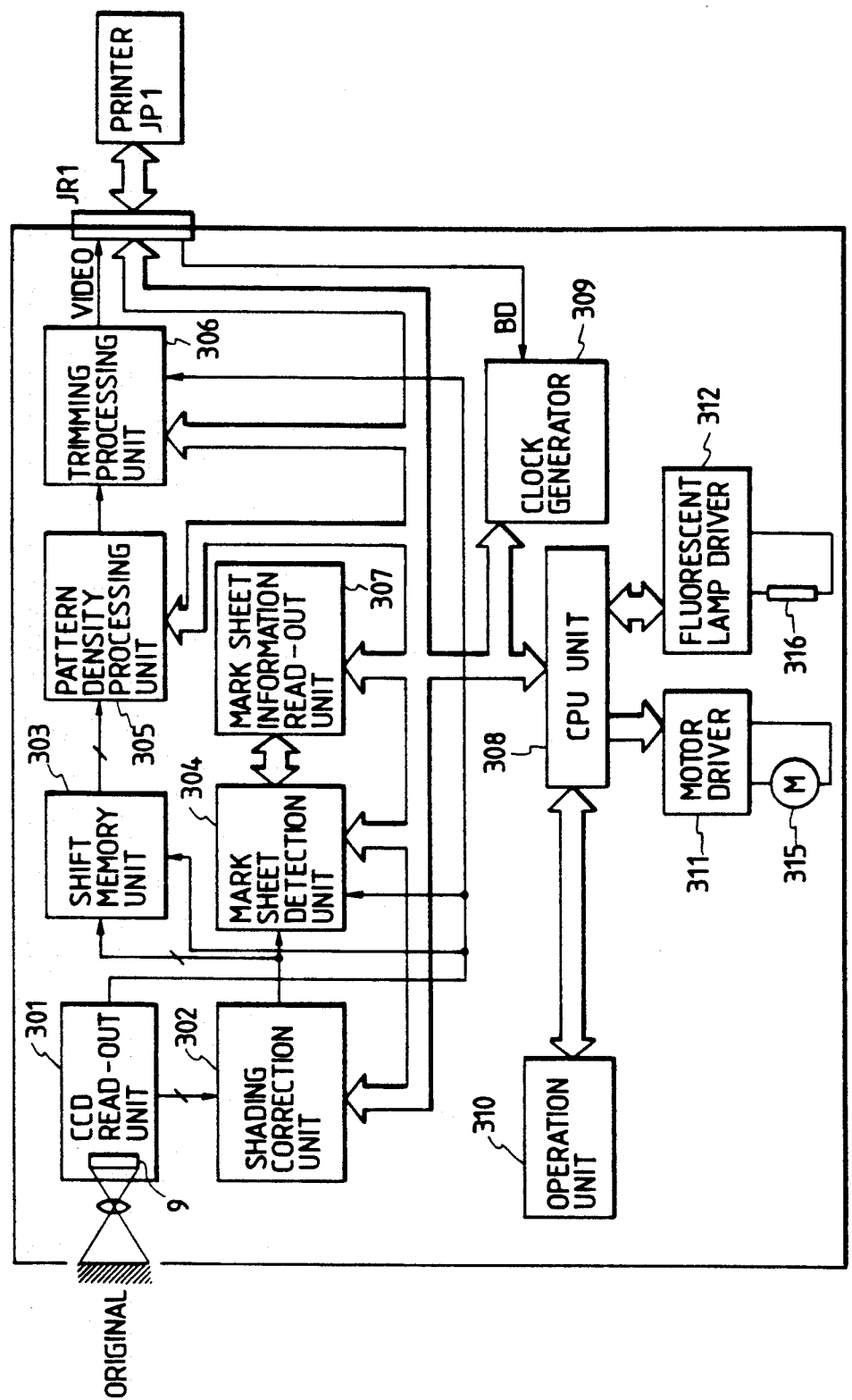
FIG. 2 is a block diagram for explaining a control construction of a reader A shown in FIG. 1.

FIG. 2 is a block diagram for explaining the construction of the reader A shown in FIG. 1. The construction and operation will now be described hereinbelow.

A CCD read-out unit 301 has therein: the CCD sensor 9; a driver of the CCD sensor 9; an amplifier to amplify an analog signal from the CCD sensor 9; an A/D converter to convert the analog signal into the digital signal; and the like. The image data of respective color components of R (red), G (green), and B (blue) each of which has been converted into the digital signal of eight bits (256 gradations) are generated from the CCD read-out unit 301 and supplied to a shading correction unit 302. In the shading correction unit 302, after shading amounts of the light source, lens, and the like were detected and corrected, the image signal is temporarily stored into a shift memory unit 303. The shift memory unit 303 has shift memories corresponding to two lines with respect to each of the colors of R, G, and B. When the image data of the Nth line has been written in the first memory, the image data of the (N-1)th line is read out from the second memory. In addition to those shift memories, the shift memory unit 303 has: a write address counter to write the image data into the shift memories; a read address counter to read out the image data; and an address selecting circuit to switch address signals of those two counters. The shading corrected image signal is supplied to a mark sheet detection unit 304 and a check is made to see if the original which has been read out by the CCD sensor 9 is a mark sheet or not. Pattern density processing unit 305 converts the signal into a two-valued density signal and trimming processing unit 306 removes a signal which is outside the original area. In a mark sheet information read-out unit 307, the signal of the mark sheet information is decoded on the basis of the input image signal. The decoded information is sent to a CPU unit 308. The CPU unit 308 selects the copying mode. Reference numeral 309 denotes a clock generator; 310 an operation unit; 311 a motor driver to drive a motor 315; and 312 a fluorescent lamp driver to light on or off a fluorescent lamp 316.

An image forming process onto a copy transfer paper will now be described.

The image signal supplied to the CCD sensor 9 is subjected to a predetermined process and is converted into a photo signal by the exposure control unit 10 and a light beam is irradiated onto the photosensitive material 11. A latent image formed on the photosensitive material 11 by the illumination light is developed by the developing devices 212 to 215. The copy transfer paper is conveyed at a timing matched with the timing to form the latent image and the developed image is transferred onto the paper by the charging device 25. The copy transferred image is fixed by the fixing device 17. After that, the paper is discharged to the outside of the apparatus by each pair of feed-out rollers 35 and 18. Or, in the two-sided copying mode or the multiplex copying mode, the paper is sent to the conveying path 24.

Explanation will now be made with respect to the case where, for instance, n originals 100 are piled and put on the base plate 101 and K mark sheets on each of which the copying mode has been recorded are inserted to the $i_j$-th ($1 \leq i_1 < i_2 < \ldots < i_j < \ldots i_k \leq n$) originals from the lowest original of the original bundle and the copying operation is executed in accordance with the information recorded on the mark sheet.

In the copying apparatus constructed as mentioned above, the CCD sensor 9 reads out the originals which are sequentially fed from the recyclic document feeder RDF. The mark sheet detection unit 304 analyzes the image information generated from the CCD sensor 9. When the detection unit 304 detects that the fed original is the mark sheet, a CPU in the CPU unit 308 allows the detected predetermined copying mode information and the conveying order of the mark sheets to be stored into an RAM in the CPU unit 308 and sets the stored copying mode for the originals which are fed before and after the mark sheet that is again fed from the RDF.

Figure 3:
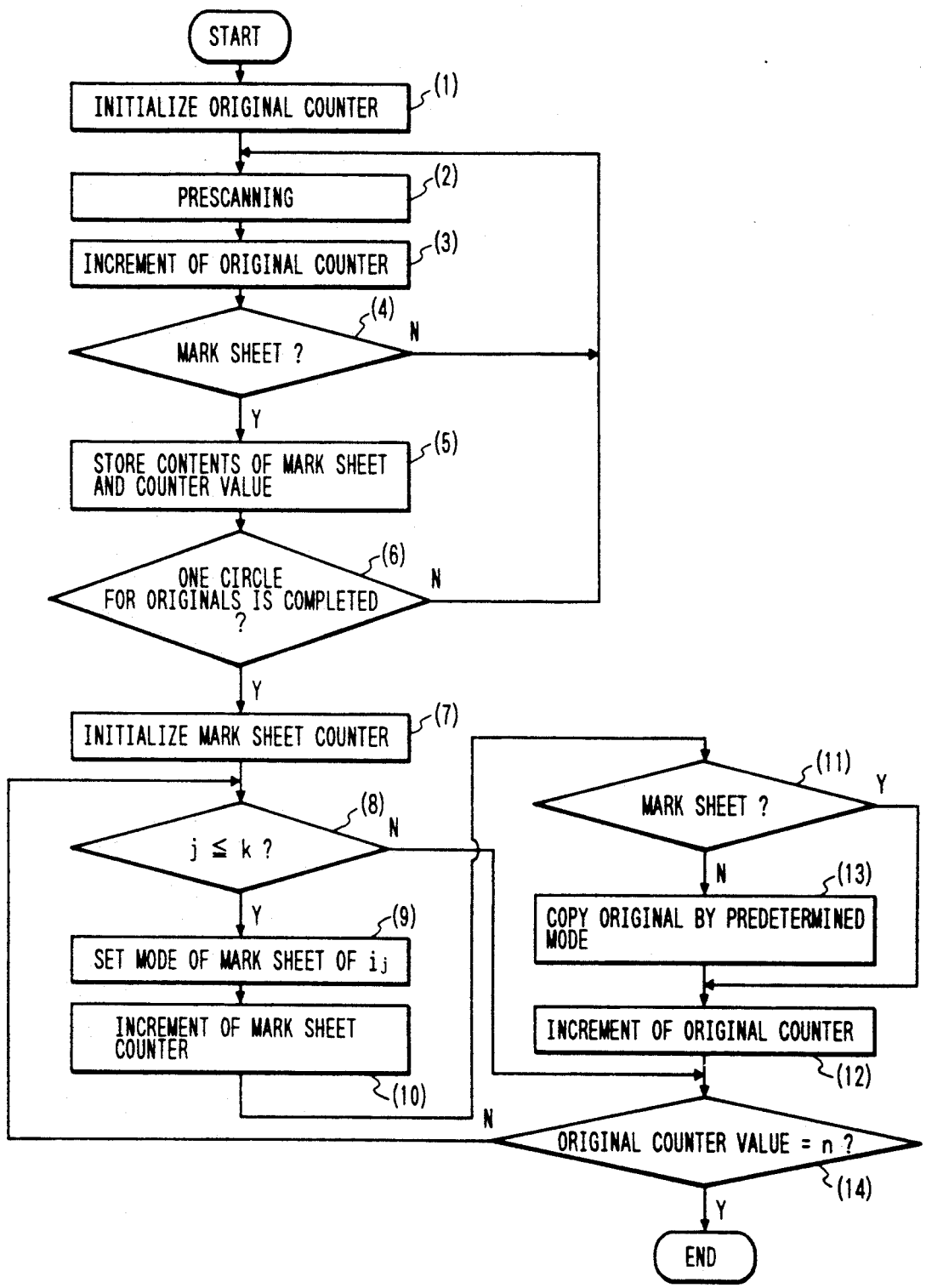
FIG. 3 is a flowchart showing an example of the first mark sheet processing procedure in the copying apparatus according to the invention.

FIG. 3 is a flowchart showing an example of a mark sheet processing procedure in the copying apparatus according to the invention. Reference numerals (1) to (14) denote processing steps. When a mark sheet mode key (not shown) of the operation unit 310 of the copying apparatus 1 is depressed, the mark sheet mode is set. When a copy start key is depressed, the above processing routine is started.

First, an original counter is initialized to "0" (step 1). As mentioned above, the originals are sequentially conveyed onto the platen 2 by the document feeder from the lowest original of the piled original bundle and are prescanned (2). A value of the original counter is increased by "+1" (3). On the basis of the image signal which is derived by the prescanning, the mark sheet detection unit 304 detects whether the original is the mark sheet or not in a manner as mentioned above (4). When it is recognized that the original is not the mark sheet, the original is fed out to the top of the original bundle put on the base plate 101 from the platen 2 through the paper feed-out/reversal roller 117. The prescanning of the $i_1$-th original is executed. When the mark sheet detection unit 304 recognizes that the $i_1$-th original is the mark sheet, the mark sheet information read-out unit 307 decodes the information of the mark sheet. Together with the read-out information, the original counter value $i_j$ ($j=1$) for the mark sheet is stored into the RAM in the CPU unit 308 (5). The above processes are executed for all (n) of the originals put on the base plate 101 (6). When the copy start key is depressed, a partition lever is set onto the top original and a CPU of the RDF discriminates that all of the originals have been fed due to the detection of the partition lever. In this instance, the bundle of originals put on the base plate 101 have been returned to the initial state.

Subsequently, the value of the mark sheet counter to count the number of mark sheets is initialized to "1" (7). A check is made to see if the value j of the mark sheet counter is equal to or less than a value k corresponding to the number of mark sheets or not (8). When j is larger than k, the processing routine advances to step (14) and subsequent steps. If YES, the information of the mark sheet corresponding to the original counter value $i_j$ is sequentially read out from the RAM and the copying mode is set in accordance with the information of the mark sheet (9). Subsequently, the mark sheet counter value j is increased by "+1" (10). The next original on the base plate 101 is fed and a check is made to see if it is the mark sheet or not (11). If NO, the copying operation is executed in the copying mode set in step 9 (13). When the original is the mark sheet, the counter value is increased by "+1" (12) and a check is made to see if the counter value is equal to n or not (14). If NO in step (14), the processing routine is returned to step (8). If YES, the processing routine is finished. The CPU of the CPU unit 308 controls the copying operation in the set copying mode.

When the mark sheet is conveyed from the document feeder onto the platen 2 during the copying operation, the copying operation is not executed and the mark sheet is soon fed out. When the original is conveyed onto the platen 2, the copying operation is performed in the set copying mode. The discrimination about the mark sheet during the copying operation is executed by comparing the count value which has been read out from the RAM and the value of the original counter which operates during the copying operation. Due to this, in the document feeder with the construction such that the originals are fed from the lowest original in the bundle of originals piled and put on the base plate, even when the original is put under the mark sheet, a desired copying mode can be accurately set for a desired original.

Figure 4:
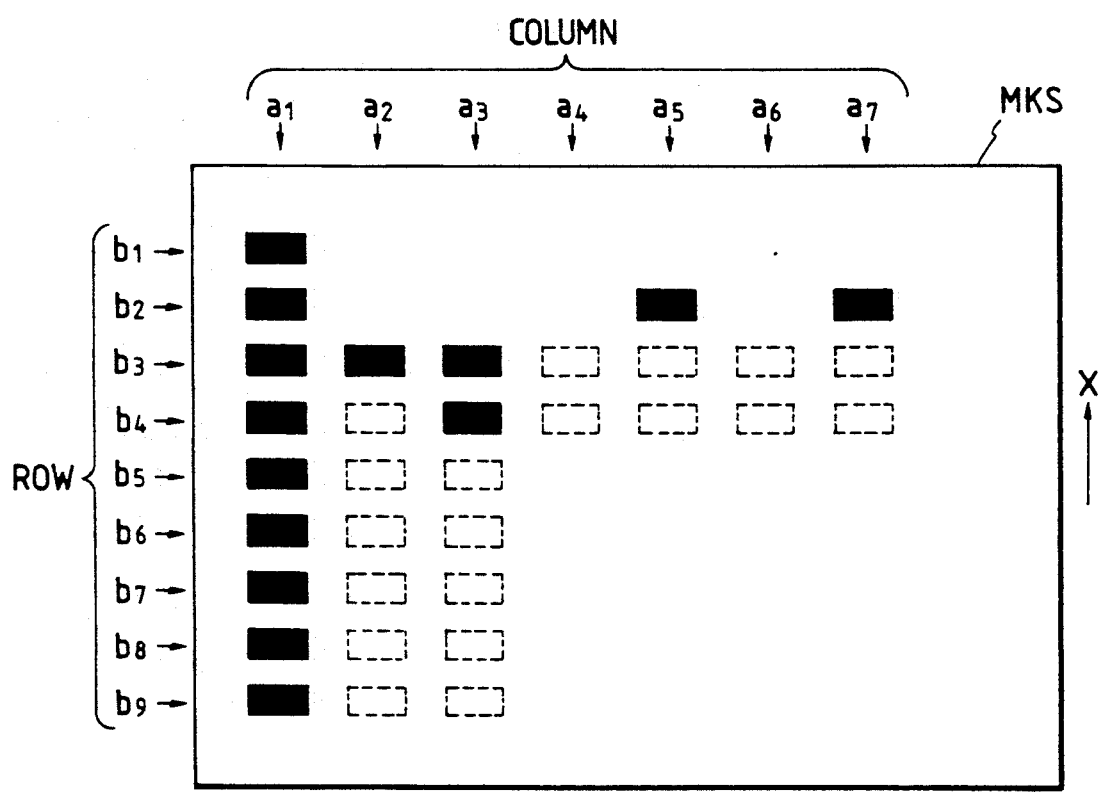
FIG. 4 is a plan view showing an example of a mark sheet.

FIG. 4 is a plan view showing an example of the mark sheet. A method of designating the original by the mark sheet will now be described hereinbelow with reference to FIG. 4.

In the diagram, MKS denotes a mark sheet and marks of the column $a_n$ and the row $b_n$ ($n=1, 2, \ldots$) indicate optical light/dark images. The portion of the column $a_1$ is used to discriminate the mark sheet is a mark to generate a mark position signal and has previously been printed on the mark sheet. The columns $a_2$ and $a_3$ are arbitrarily written when setting the number of sheets. The portion of the column $a_5$ and the row $b_2$ and the portion of the column $a_7$ and the row $b_2$ indicate marks to regard that the signal after the next row $b_3$ is valid when those marks are written. The column $a_2$ corresponds to the location of 10. The column $a_3$ corresponds to the location of 1. The row $b_3$ corresponds to $2^0$. The row $b_4$ corresponds to $2^1$. The row $b_5$ corresponds to $2^2$. The row $b_6$ corresponds to $2^3$. For instance, in the case of needing thirteen copies, the marks corresponding to the (column $a_2$, row $b_3$), (column $a_3$, row $b_3$), and (column $a_3$, row $b_4$) are written In FIG. 4, X indicates the conveying direction.

In the embodiment, the designation of the original to which the copying mode that is designated by the mark sheet MKS is applied can be individually set for the original put on the mark sheet MKS and the original put under the mark sheet MKS. For the original put on the mark sheet MKS, it is designated by the sections of the columns $a_4$ and $a_5$. The section of (column $a_5$, row $b_2$) denotes that the setting of the copying mode is made valid until the next mark sheet MKS is detected. When the next mark sheet MKS doesn't exist, the setting is made valid until the top original. The practical number of originals can be designated by the row $b_3$ and subsequent rows. For the original put under the mark sheet MSK, it is designated by the section of the columns $a_6$ and $a_7$. The section of (column $a_7$, row $b_2$) is used to make the setting of the copying mode valid until the next mark sheet MKS is detected. When the next mark sheet MKS doesn't exist, the setting until the lowest original is made valid. The practical number of originals can be designated by using the row $b_3$ and subsequent rows.

When the copying apparatus cannot cope with the copying mode set by the mark sheet MKS, an error message is supplied to a display (not shown) of the main body of the copying apparatus 1. When the designation of the number of originals is omitted, the copying mode set for the $i_1$-th sheet can be applied to the original under the $i_1$-th mark sheet MKS. The copying mode set for the $i_1$-th mark sheet MKS can be applied to the original on the $i_1$-th mark sheet MKS until the set copying mode is changed by the next mark sheet MKS or the value of the original counter is equal to n.

For instance, when only one mark sheet MKS as shown in FIG. 4 has been inserted in the n originals, thirteen copies are obtained for each of all originals.

The above embodiment has been described with respect to the case where after the original was conveyed to the fixed position, the prescanning is executed and the mark sheet MKS is detected. However, as shown in FIG. 5, the information of the mark sheet MKS can be also detected when the original is conveyed.

Figure 5:
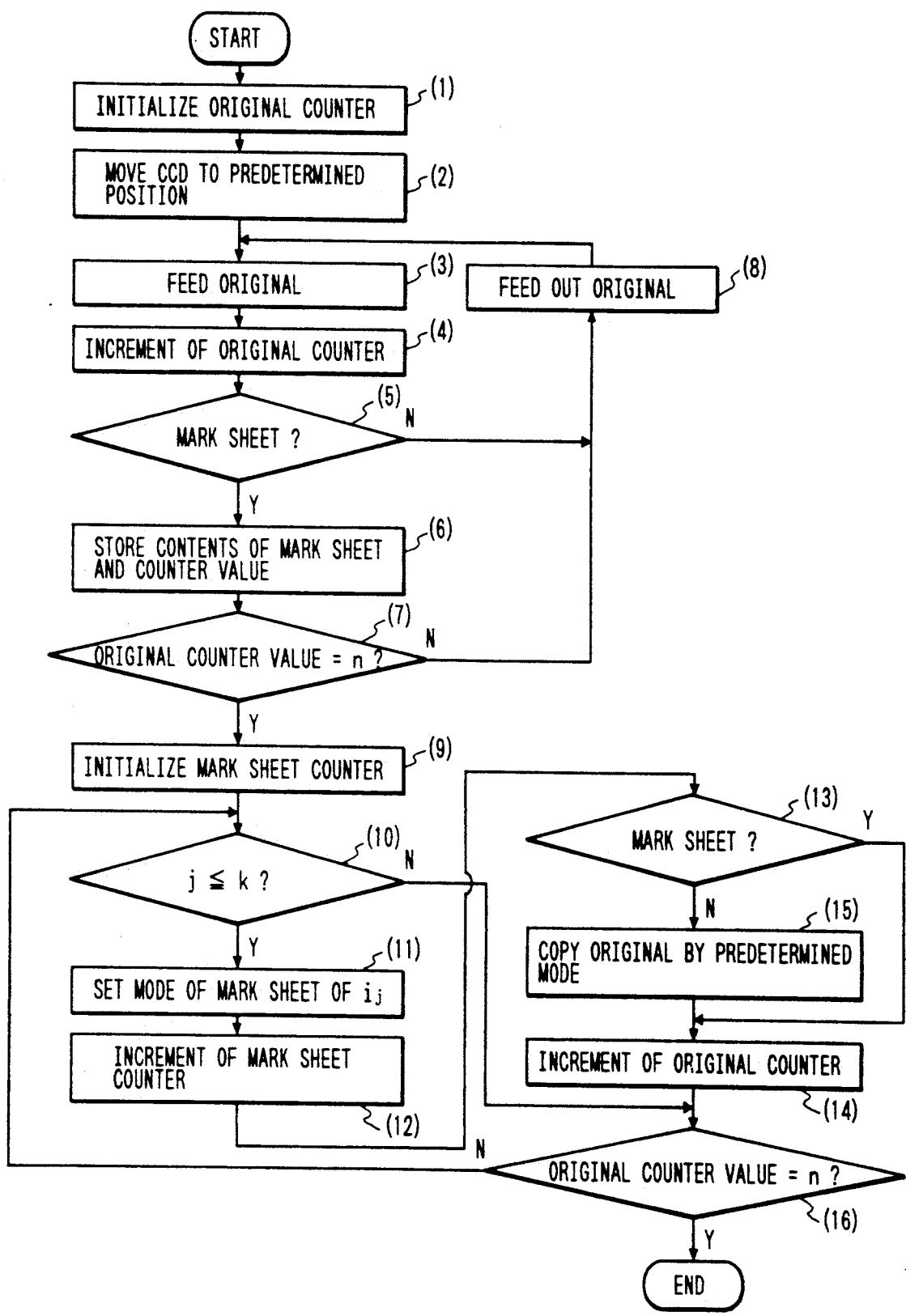
FIG. 5 is a flowchart showing an example of the second mark sheet processing procedure in the copying apparatus according to the invention.

FIG. 5 is a flowchart showing an example of the second mark sheet processing procedure in the copying apparatus according to the invention. Reference numerals (1) to (14) indicate processing steps. When the mark sheet mode key (not shown) of the main body of the copying apparatus 1 is depressed, the mark sheet mode is set. When the copy start key of the operation unit 310 shown in FIG. 2 is depressed, the processing routine is started.

First, the original counter is initialized to "0" (step 1). After the optical system was moved to a predetermined exposure position (2), the originals are sequentially conveyed onto the platen 2 by the document feeder from the first original (3). The value of the counter is increased by "+1" (4). As mentioned above, on the basis of the signal from the CCD sensor 9, the mark sheet detection unit 304 discriminates whether the original is the mark sheet or not (5). If NO, the original is fed out to the top of the bundle of originals put on the base plate 101 from the platen 2 through the feed-out/reversal roller 117. When the mark sheet detection unit 304 recognizes that the $i_1$-th original is the mark sheet, the mark sheet information read-out unit 307 decodes the information of the mark sheet. Together with the read-out information, the original counter value of the mark sheet $i_1$ is stored into the RAM (not shown) (6). The above processes are executed for all of the originals put on the base plate 101 (7). In this instance, the bundle of originals on the base plate 101 have been returned to the initial state. On the other hand, if NO in steps (5) and (7), the original is discharged to the outside of the apparatus (8) and the processing routine is returned to step (3).

Subsequently, the value of the mark sheet counter is initialized to "1" (9). A check is made to see if the value j of the mark sheet counter is equal to or less than the value K of the number of mark sheets or not (10). If j is larger than K, the processing routine advances to step (14) and subsequent steps. If YES, the information of the mark sheet corresponding to the original counter value $i_j$ is sequentially read out from the RAM and the copying mode is set in accordance with the content of the mark sheet (11). Subsequently, the mark sheet counter value j is increased by "+1" (12). The next original on the base plate 101 is fed and a check is made to see if it is the mark sheet or not (13). If NO, the copying operation is executed (step 15) in the copying mode set in step (11). If YES, the original counter value is increased by "+1" (14). A check is made to see if the original counter value is equal to n or not (16). If NO in step (16), the processing routine is returned to step (10). If YES, the processing routine is finished. The CPU of the CPU unit 308 controls the copying operation in the set copying mode. Due to this, since the information of the mark sheet is read out when the original is conveyed, the prescanning of the original is unnecessary and the reading speed can be improved.

In the above embodiment, only the number of copies has been set by the mark sheet. However, by increasing the number of mark sections of the mark sheet, various copying modes such as a copy magnification and the like can be set.

The present invention is not limited to the foregoing embodiments but many modifications and variations are possible within the spirit and scope of the appended claims of the invention.

What is claimed is:

1. An image processing mode setting apparatus comprising:
   a base plate on which a plurality of originals are stackable;
   original feeding means for feeding the originals stacked on the base plate one by one to an exposing position and for feeding out said originals onto the base plate after completion of an exposure;
   reading means for reading images of the originals which have been fed to the exposing position by said feeding means;
   detecting means for detecting a special sheet on which an image processing mode has been written on the basis of an image signal generated from said reading means;
   memory means for storing the image processing mode which has been written on said special sheet and which has been detected by said detecting means; and
   setting means for setting the image processing mode stored in said memory means for the original which is fed before said special sheet after all the originals stacked on the base plate were fed.

2. An apparatus according to claim 1, wherein said original feeding means feeds a plurality of originals stacked on the base plate in a state in which the surface of the exposed faces upward from the lowest original.

3. An apparatus according to claim 1, further having second memory means for storing a feeding order of said special sheet detected by said detecting means,
   and wherein on the basis of said feeding order of the special sheet stored in said second memory means, said setting means determines which one of said plurality of image processing modes stored in the memory means is set for which one of originals.

4. An image processing mode setting apparatus comprising:
   a base plate on which a plurality of originals are stackable;
   original feeding means for feeding the originals stacked on the base plate one by one to an exposing position and for feeding out the originals onto the base plate after completion of an exposure;
   reading means for reading images of the originals fed to the exposing position by said feeding means;

detecting means for detecting a special sheet on which an image processing mode has been written on the basis of an image signal generated from said reading means;

memory means for storing the image processing mode which has been written on said special sheet and which has been detected by said detecting means; and setting means for setting the image processing mode stored in said memory means for the original which is fed before said special sheet and for the original which is fed after said special sheet after all of the originals stacked on the base plate were fed.

5. An apparatus according to claim 4, wherein said original feeding means feeds a plurality of originals stacked on the base plate in a state in which the surface to be exposed faces upward from the lowest original.

6. An apparatus according to claim 4, wherein said setting means set the same image processing mode for the original which is fed before said special sheet and for the original which is fed after said special sheet.

7. An apparatus according to claim 4, wherein said setting means sets different image processing modes for the original which is fed before said special sheet and for the original which is fed after said special sheet.

* * * * *

UNITED STATES PATENT AND TRADEMARK OFFICE
CERTIFICATE OF CORRECTION

PATENT NO. : 5,235,396

DATED : August 10, 1993

INVENTOR(S) : HIROHIKO ITO, et al.

It is certified that error appears in the above-identified patent and that said Letters Patent is hereby corrected as shown below:

COLUMN 2

Line 35, "platen 2, and" should read --platen 2, an optical system unit 4 which contains--;
Line 36, "mirror 5," should be deleted; "source 3," should read --source 3--; and "mirror 5" should read --mirror 5,--;
Line 53, "charger 27 is provided to charge the photosensitive" should read --sheet sensor 50 and--;
Line 54, "material 11," should be deleted.

COLUMN 3

Line 53, "conveyed" should read --is conveyed--;
Line 54, "platen 2, optical system 4" should read --platen 2. Optical system 4,--.

COLUMN 5

Line 5, "K mark sheets" should read --k mark sheets--.

COLUMN 6

Line 35, "is used" should read --used--;
Line 49, "written In" should read --written. In--;
Line 64, "MSK," should read --MKS,--.

COLUMN 7

Line 60, "value K" should read --value k--;
Line 61, "than K," should read --than k,--.

UNITED STATES PATENT AND TRADEMARK OFFICE
CERTIFICATE OF CORRECTION

PATENT NO. : 5,235,396

DATED : August 10, 1993

INVENTOR(S) : HIROHIKO ITO, et al.

It is certified that error appears in the above-identified patent and that said Letters Patent is hereby corrected as shown below:

<u>COLUMN 8</u>

Line 50, "of the" should --to be--.

Signed and Sealed this

Tenth Day of May, 1994

*Attest:*

BRUCE LEHMAN

*Attesting Officer*   *Commissioner of Patents and Trademarks*